United States Patent
Suh et al.

(10) Patent No.: US 9,417,912 B2
(45) Date of Patent: Aug. 16, 2016

(54) ORDERING TASKS SCHEDULED FOR EXECUTION BASED ON PRIORITY AND EVENT TYPE TRIGGERING THE TASK, SELECTING SCHEDULERS FOR TASKS USING A WEIGHT TABLE AND SCHEDULER PRIORITY

(75) Inventors: Sang-Bum Suh, Seoul (KR); Jae-Min Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 13/045,698

(22) Filed: Mar. 11, 2011

(65) Prior Publication Data

US 2011/0225583 A1    Sep. 15, 2011

(30) Foreign Application Priority Data

Mar. 12, 2010    (KR) .................. 10-2010-0022495

(51) Int. Cl.
*G06F 9/46*    (2006.01)
*G06F 9/455*    (2006.01)
*G06F 9/48*    (2006.01)

(52) U.S. Cl.
CPC ............ *G06F 9/4887* (2013.01); *G06F 9/4843* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 6,779,182 B1* | 8/2004 | Zolnowsky | ............ 718/103 |
| 6,981,258 B1 | 12/2005 | Takakura | |
| 7,093,250 B1* | 8/2006 | Rector | ............ 718/100 |
| 7,296,271 B1 | 11/2007 | Chalmer et al. | |
| 7,356,817 B1 | 4/2008 | Cota-Robles et al. | |
| 7,657,890 B2 | 2/2010 | Kanai et al. | |
| 7,725,583 B2* | 5/2010 | Jackson | ............ 709/226 |
| 7,926,058 B2* | 4/2011 | Amin | ............ 718/102 |
| 2003/0037089 A1 | 2/2003 | Cota-Robles et al. | |
| 2005/0071840 A1 | 3/2005 | Neiger et al. | |
| 2006/0161922 A1* | 7/2006 | Amano et al. | ............ 718/103 |
| 2007/0022425 A1* | 1/2007 | Jackson | ............ 718/104 |
| 2007/0220517 A1* | 9/2007 | Lippett | ............ 718/102 |

(Continued)

FOREIGN PATENT DOCUMENTS

| | | |
|---|---|---|
| EP | 0 838 757 A1 | 4/1998 |
| EP | 1 059 582 A2 | 12/2000 |

(Continued)

OTHER PUBLICATIONS

Extended European Search Report (including European Search Opinion) issued on Aug. 23, 2011, in counterpart European Patent Application No. 11158011.1 (8 pages, in English).

(Continued)

*Primary Examiner* — Meng An
*Assistant Examiner* — Bradley Teets
(74) *Attorney, Agent, or Firm* — NSIP Law

(57) ABSTRACT

A virtual machine monitor and a scheduling method thereof is provided. The virtual machine monitor may operate at least two domains. The virtual machine monitor may include at least one run queue and a plurality of schedulers, at least two of the plurality of schedulers comprising different scheduling characteristics. The virtual machine monitor may insert a task received from the domain into the run queue and may select a scheduler for scheduling the task, which may be inserted into the run queue, from the schedulers, according to an event type.

25 Claims, 12 Drawing Sheets

(56) References Cited

U.S. PATENT DOCUMENTS

| | | | |
|---|---|---|---|
| 2008/0244584 A1* | 10/2008 | Smith et al. | 718/102 |
| 2008/0320478 A1* | 12/2008 | Singh et al. | 718/102 |
| 2009/0037926 A1* | 2/2009 | Dinda et al. | 718/107 |
| 2009/0241112 A1* | 9/2009 | Shimogawa | 718/1 |
| 2009/0300637 A1 | 12/2009 | Ringseth et al. | |
| 2009/0307308 A1 | 12/2009 | Siegemund et al. | |
| 2010/0023949 A1* | 1/2010 | Jackson | 718/104 |
| 2010/0088704 A1* | 4/2010 | Ringseth et al. | 718/102 |

FOREIGN PATENT DOCUMENTS

| | | |
|---|---|---|
| JP | 7-191863 A | 7/1995 |
| JP | 2000-137621 A | 5/2000 |
| JP | 2000-347883 | 12/2000 |
| JP | 2001-117786 | 4/2001 |
| KR | 10-0349658 | 8/2002 |
| KR | 10-0623217 | 6/2006 |
| KR | 10-2007-0092559 | 9/2007 |
| KR | 10-2008-0112269 | 12/2008 |

OTHER PUBLICATIONS

Armand, Francois, et al., "A Practical Look at Micro-Kernels and Virtual Machine Monitors," Consumer Communications and Networking Conference, 2009, $6^{th}$ IEEE, Jan. 10, 2009, pp. 1-7, IEEE, Piscataway, NJ, USA.

Chinese Office Action issued on May 28, 2015 in counterpart Chinese Application No. 201110058516.8 (16 pages, with English translation).

Japanese Office Action issued on Sep. 1, 2015 in counterpart Japanese Patent Application No. 2011-054346 (pp. 1-3 in English; pp. 4-6 in Japanese)

Korean Office Action issued on Feb. 19, 2016 in counterpart Korean Patent Application No. 10-2010-0022495 (3 pages in English; 4 pages in Korean).

European Office Action issued on Feb. 29, 2016 in counterpart European Patent Application No. 11 158 011.4 (5 pages in English).

Japanese Office Action issued on Jun. 7, 2016 in counterpart Japanese Patent Application No. 2011-054346 (5 pages, in Japanese, with English language translation).

* cited by examiner

FIG. 2

| SCHEDULER LIST ||
|---|---|
| EVENT | SCHEDULER TO BE INVOKED |
| E1 | S1 |
| E2 | S1 |
| E3 | S2 |
| ⋮ | ⋮ |

FIG. 3

| WEIGHT TABLE 141 | | |
|---|---|---|
| TASK ATTRIBUTE 301 | WEIGHT 302 | |
| | S1 | S2 |
| A1 | 100 | 1 |
| A2 | 50 | 1 |
| A3 | 1 | 100 |
| ⋮ | ⋮ | ⋮ |

FIG. 4

| TIME TABLE 142 | |
|---|---|
| TASK | RUN TIME LIMIT |
| T1 | - |
| T2 | - |
| T3 | t1 |
| ⋮ | ⋮ |

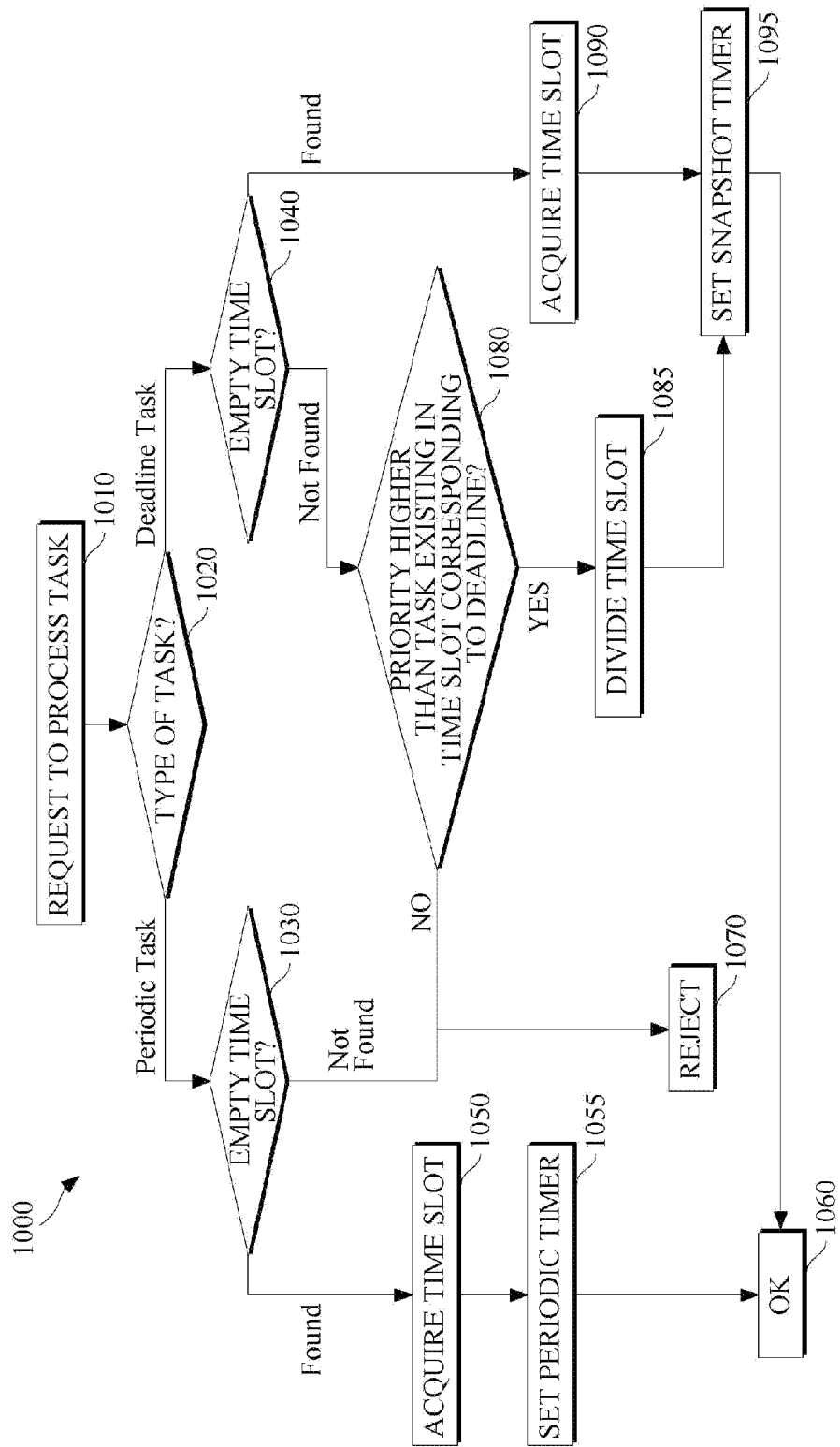

ORDERING TASKS SCHEDULED FOR EXECUTION BASED ON PRIORITY AND EVENT TYPE TRIGGERING THE TASK, SELECTING SCHEDULERS FOR TASKS USING A WEIGHT TABLE AND SCHEDULER PRIORITY

CROSS-REFERENCE TO RELATED APPLICATION(S)

This application claims the benefit under 35 U.S.C. §119(a) of Korean Patent Application No. 10-2010-0022495, filed on Mar. 12, 2010, in the Korean Intellectual Property Office, the entire disclosure of which is incorporated herein by reference for all purposes.

BACKGROUND

1. Field

The following description relates to a virtualization technology for concurrently operating a plurality of operating systems, and a scheduling technology of achieving the real time operation.

2. Description of the Related Art

Virtualization is a technology allowing multiple virtual machines having their own operating systems to operate in a single host computer.

According to virtualization, the host computer executes a virtual machine monitor, and the executed virtual monitor creates a plurality of virtual machines. A virtual machine (VM) is an implementation of a machine (i.e., a computer) that executes programs like a physical machine. The VM may be software or a system-on-chip (SOC). One use is to support a real-time operating system at the same time as a high-level operating system (OS), such as Linux or Windows. The virtual machines created by the host computer can run concurrently, and each of the virtual machines has its own virtual hardware resources. For example, each of the virtual machines may have one or more Virtual Central Processing Unit (VCPU), and may occupy a part of the memory of the host computer.

Scheduling in a virtualization environment is achieved in a VCPU unit; as such, the conventional scheduling is achieved only based on a Time Quantum (time limit) allocated to each VCPU. Accordingly, this causes a limitation on supporting real-time functionality in the system. Although virtualization has been used in server technology, for each server application, system resources were equally used among VMs; as such, the conventional technology is not usable in consumer electronics having real-time processing needs.

SUMMARY

In one general aspect, there is provided a virtual machine monitor for operating at least two domains, the virtual machine monitor including: a run queue, a plurality of schedulers, at least two of the plurality of schedulers including different scheduling characteristics, and a controller configured to: insert a task received from the domain into the run queue, and select a scheduler for scheduling the task, the task being inserted into the run queue, from the schedulers, according to an event type.

The virtual machine monitor may further include a table storage configured to store at least one of: a weight table configured to record a priority weight of the task, depending on the event type, a time table configured to record a run time limit of the task, and a scheduler list configured to record a scheduler to be selected according to the event type.

In the virtual machine monitor, the controller may be further configured to: insert the received task into the run queue, and determine an order of priority of the task by use of: an attribute of the task and the weight table.

In the virtual machine monitor, the attribute of the task may include an event source to trigger the task.

In the virtual machine monitor, the priority weight may vary with a type of the scheduler.

In the virtual machine monitor, the controller may be further configured to: insert the received task into the run queue, and determine an order of priority of the received task, depending on: a need for urgent processing of the received task or a need for real-time processing of the received task.

In the virtual machine monitor, the controller may be further configured to: insert the received task into the run queue, and generate or update the time table.

In the virtual machine monitor: the controller may be further configured to invoke the selected scheduler, and the task inserted into the run queue may be scheduled according to a characteristic of the invoked scheduler.

In the virtual machine monitor, a plurality of the run queues may be provided.

In the virtual machine monitor, the run queues may be respectively mapped to a plurality of physical resources that are managed by the virtual machine monitor.

In the virtual machine monitor, the run queues may be mapped to the schedulers, respectively.

In the virtual machine monitor, the controller may be further configured to determine a run queue, into which the task is inserted, according to an attribute of the received task.

In the virtual machine monitor: the run queue may be provided in a form of a matrix having rows and columns, and the controller may be further configured to determine the row and the column, into which the task is inserted, according to an attribute of the received task.

In the virtual machine monitor: the scheduler may include a deadline scheduler, and the controller may be further configured to invoke the deadline scheduler in response to a time interrupt occurring as the event type.

In another general aspect, there is provided a scheduling method of a virtual machine monitor for operating at least two domains, the scheduling method including: inserting a task received from the domain into a run queue, and selecting a scheduler for scheduling the task, the task being inserted into the run queue, from the schedulers, according to an event type.

In the scheduling method, the inserting of the task may include determining an order of priority of the task by use of: an attribute of the task and a weight table which records a priority weight of the task, depending on the event type.

In the scheduling method, the inserting of the task may include generating or updating a time table which records an run time limit of the task.

In the scheduling method, the inserting of the task may include determining a run queue, into which the task is inserted, according to an attribute of the received task.

The scheduling method may further include: invoking the selected scheduler, wherein the task inserted into the run queue is scheduled according to a characteristic of the invoked scheduler.

In another general aspect, there is provided a computer-readable information storage medium including a program to instruct a computer to implement a scheduling method of a virtual machine monitor for operating at least two domains, including: inserting a task received from the domain into at least one run queue, and selecting a scheduler for scheduling the task, is the task being inserted into the run queue, from the schedulers, according to an event type.

In another general aspect, there is provided a method for providing real-time characteristics of real-time tasks executed in a plurality of virtual machines, the method including: including a real-time task in a target for scheduling on a virtual machine monitor (VMM), maintaining a plurality of run queues, each including a different characteristic on the VMM, and invoking a scheduler through identification of a state of the plurality of virtual machines.

The method may further include corresponding a schedule entity, the plurality of run queues, and a central processing unit (CPU) to schedule the real-time task.

The method may further include testing a possibility of scheduling the real-time tasks through an admission control of the VMM.

The method may further include adjusting a priority order of tasks based on at least one of: an event weight table and a time chart.

The method may further include invoking and executing the scheduler in a preemptive manner by grouping targets to be scheduled.

In another general aspect, there is provided a virtual machine monitor for operating at least two domains, the virtual machine monitor including: a controller configured to: insert a task received from a domain into a run queue, and select a scheduler among a plurality of schedulers, at least two of the plurality of schedulers including different scheduling characteristics, for scheduling the task, according to an event type.

The virtual machine monitor may further include a table storage configured to store at least one of: a weight table configured to record a priority weight of the task, depending on the event type, a time table configured to record a run time limit of the task, and a scheduler list configured to record a scheduler to be selected according to the event type.

In the virtual machine monitor, the controller may be further configured to: insert the received task into the run queue, and determine an order of priority of the task by use of: an attribute of the task and the weight table.

In the virtual machine monitor, the attribute of the task may include an event source to trigger the task.

In the virtual machine monitor, the priority weight may vary with a type of the scheduler.

In the virtual machine monitor, the controller may be further configured to: insert the received task into the run queue, and determine an order of priority of the received task, depending on: a need for urgent processing of the received task or a need for real-time processing of the received task.

In the virtual machine monitor, the controller may be further configured to: insert the received task into the run queue, and generate or update the time table.

In the virtual machine monitor: the controller may be further configured to invoke the selected scheduler, and the task inserted into the run queue may be scheduled according to a characteristic of the invoked scheduler.

In the virtual machine monitor: the run queue may be provided in a form of a matrix having rows and columns, and the controller may be further configured to determine the row and the column, into which the task is inserted, according to an attribute of the received task.

In the virtual machine monitor: the scheduler may include a deadline scheduler, and the controller may be further configured to invoke the deadline scheduler in response to a time interrupt occurring as the event type.

The virtual machine monitor may further include a plurality of run queues, each run queue including at least one task, each run queue being associated with a respective one of the plurality of schedulers.

In the virtual machine monitor, the selected scheduler may be configured to be interrupted by an interrupting scheduler, among the plurality of schedulers, upon receipt of an event.

In the virtual machine monitor, upon completion of the task in a run queue associated with the interrupting scheduler, the virtual machine monitor may be configured to process a run queue associated with the original interrupted scheduler.

In the virtual machine monitor, upon completion of the task in a run queue associated with the interrupting scheduler, the virtual machine monitor may be configured to process a run queue associated with a third scheduler queue.

In the virtual machine monitor: the run queue may be associated with the selected scheduler, and the selected scheduler may be configured to process another run queue corresponding to another scheduler, among the plurality of schedulers, in response to no event triggering a change in schedulers.

In the virtual machine monitor, the selected scheduler may be further configured to: process part of the run queue associated with the selected scheduler, and subsequently process the another run queue corresponding to the another scheduler.

In the virtual machine monitor, an urgency of a task or event may change a priority order of a plurality of tasks in the run queue.

A computer-readable information storage medium may including a program to instruct a computer to implement the above methods.

Other features and aspects may be apparent from the following detailed description, the drawings, and the claims.

BRIEF DESCRIPTION OF THE DRAWINGS

FIG. 2 shows an example of a scheduler list.
FIG. 3 shows an example of a weight table.
FIG. 4 shows an example of a time table.
FIG. 10 shows an example of a method for control logic for a virtual machine monitor.

Figure 1:
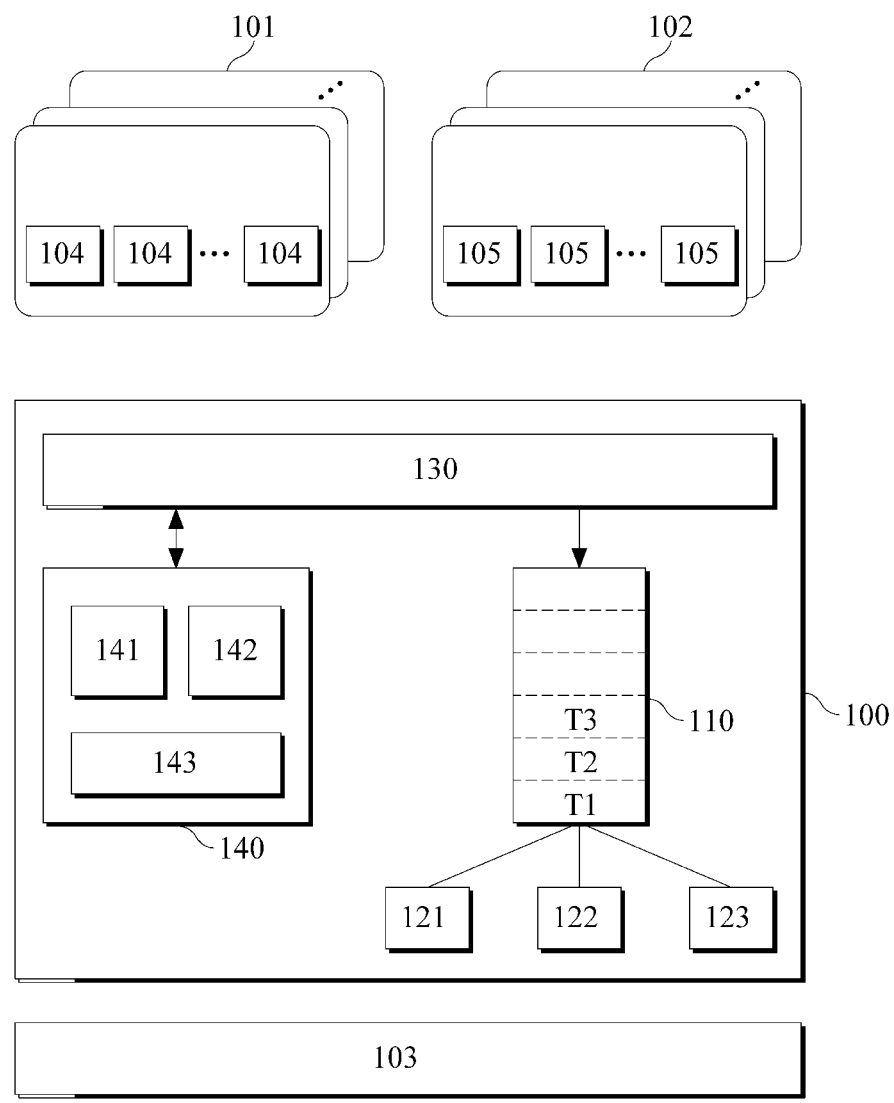
FIG. 1 shows an example of a virtual machine monitor.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 shows an example of a virtual machine monitor (VMM).

As shown in FIG. 1, the virtual machine monitor 100 may exist among a plurality of domains 101 and 102, and a hardware platform 103. Each of the domains 101 and 102 may be an operating system or an application program. The hardware platform 103 may be a physical device such as a central processing unit (CPU), a memory, and an input/output port.

The virtual machine monitor 100 may allow the plurality domains 101 and 102 to operate concurrently by virtualizing the hardware platform 103. That is, each of the domains 101 and 102 may be capable of using of a single physical system resource as multiple virtualization-system resources through the virtualization by the virtual machine monitor 100.

The domains 101 and 102 may be classified into a host domain 101, which may have direct access to the hardware platform 103, and a guest domain 102 which may use the hardware platform 103 with assistance from the host domain 101. Respective domains 101 and 102 may include various types of tasks 104 and 105.

The virtual machine monitor 100 may include at least one run queue 110; a plurality of schedulers 121, 122, and 123; a controller 130, and a table storage 140.

The run queue 110 may store the tasks 104 and 105 received from the domains 101 and 102, or information about the tasks 104 and 105. According to this example, the tasks 104 and 105 may be stored in the run queue 110 in the form of a schedule entity which may serve as a unit for scheduling.

Tasks T1, T2, and T3, stored in the run queue 110, may serve as objects to be scheduled by the schedulers 121, 122, and 123. The virtual machine monitor 100, according to this example, may include a single run queue 110 or a plurality of run queues 110. In an example in which the virtual machine monitor 100 includes a plurality of run queues 110 (see, e.g., FIGS. 6A and 6B), the run queues 110 may be bound to CPU cores (e.g., CPU#0, CPU#1, CPU#2 in FIGS. 6A and 6B), respectively, or to schedulers 121, 122, and 123, respectively. In addition, each run queue 110 may be managed in the form of a two-dimensional (2D) matrix (see, e.g., FIG. 8). The order of the tasks, e.g., tasks T1, T2, and T3, is not limited the that illustrated in the drawings.

Figure 8:
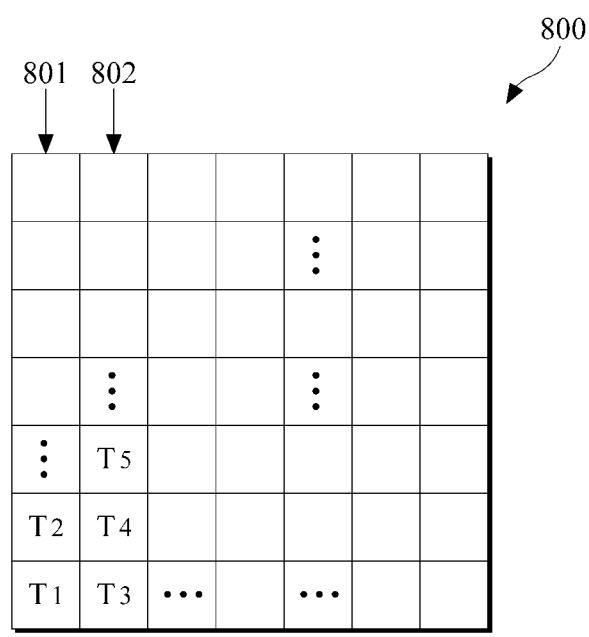
FIG. 8 shows an example of a run queue.

FIG. 8 shows an example of a run queue.

As shown in FIG. 8, a run queue 800 may be provided in the form of a two-dimensional matrix. In an example of the run queue 800 having a two-dimensional matrix, tasks having different attributes may be stored among rows or columns. For example, task 1 T1 and task 2 T2, having an attribute A, may be stored in a first column 801; and task 3 T3, task 4 T4, and task 5 T5, having an attribute B, may be stored in a second column 802.

The attribute of a task may represent a requirement for triggering the task. For example, task 1 T1 and task T2 may be tasks triggered by a predetermined event; task 3 T3, task 4 T4, and task 5 T5 may be tasks triggered by a predetermined interrupt. Such attributes of tasks may include event, e.g., source, deadline, and/or interrupt. These are nonlimiting examples of tasks.

Referring again to FIG. 1, the schedulers 121, 122, and 123 may determine the execution order of the tasks T1, T2, and T3 residing on the run queue 110. The schedulers 121, 122, and 123 may each have different scheduling characteristics. For example, the first scheduler 121 may be a deadline first scheduler, the second scheduler 122 may be a round-robin scheduler, and the third scheduler 123 may be an event first scheduler. However, the type of scheduler is not limited thereto and may be provided in various forms. At least two of the schedulers may have different scheduling characteristics.

The tasks T1, T2, and T3 residing on the run queue 110 may be scheduled by one of the schedulers 121, 122, and 123, for example, the first scheduler 121, which may be the most suitable for achieving real-time performance at a predetermined time.

The controller 130 may receive the tasks 104 and 105 from the respective domains 101 and 102, and may insert the received tasks 104 and 105 into the run queue 110. According to one example, the tasks 104 and 105 may be inserted in the run queue 110 in the form of a schedule entity which may serve as a unit for scheduling The control unit 130 may insert the tasks 104 and 105 into the run queue 110 such that the tasks 104 and 105 may be divided based on attribute. For example, as shown in FIG. 8, the run queue 800 may be managed in the form of a matrix, and tasks may be inserted into the run queue 800 such that attributes of tasks may be different among rows or columns. The attribute of a task may represent a requirement for triggering the task, and may include an event source, such as a call transmission/reception, a deadline, and/or an interrupt. Information about attribute of a task may be collected through an operating system (OS) corresponding to the domains 101 and 102.

In addition, in response to the controller 130 inserting the tasks 104 and 105, the controller 130 may adjust the run queue 110 based on the order of priority of tasks. If the attribute of the task corresponds to an event, the order of priority of the task may be determined based on a weight table 141. In addition, if the attribute of the task corresponds to an event, the order of priority of the task may not be determined using the weight table 141, but depending on the need for urgent processing of tasks or the need for real time processing of tasks. The need for urgent processing or the need for real time processing may be determined based on the deadline of the task.

As one example, the controller 130 may learn which task is to be triggered by which event type, based on information provided by an operating system. The weight table 141 may store priority weights of a task, depending on the type of an event, for the respective schedulers 121, 122, and 123. For example, even if the task 1 T1 and the task 2 T2 have attributes corresponding to an even, if the task 1 T1 is trigged by event type E1 and the task 2 T2 is triggered by event type E2, the control unit 130 may determine the order of priority of the task 1 T1 and the task 2 T2 with reference to the attribute A1, A2, and A3 of the task related to the trigger requirement shown in the weight table 141.

As another example, if the task 1 T1 and the task 2 T2 have attributes corresponding to an event and both of the task 1 T1 and the task 2 T2 are trigged by event type E1, the control unit 130 may determine the order of priority of the task 1 T1 and the task 2 T2 based on the need for urgent processing of tasks or the need for real time processing of tasks. For example, if the task 1 T1 has a deadline of five seconds and the task 2 T2 has a deadline of ten seconds, the task 1 T1 may need to be processed more urgently compared to the task 2 T2, such that the task 1 T1 has a higher priority than the task 2 T2.

In addition, the controller 130 may insert the tasks 104 and 105 into the run queue 110, and may generate or update a time table 142 of the table storage 140. The time table 142 may store time related limitation for each task, e.g., a run time limit for each task. For example, if the controller 130 receives the task 3 T3 having a time limit as a task attribute, the controller 130 may insert the task T3 into the run queue 110 and record the run time limit of the task 3 T3 in the time table 142.

In addition, the controller 130 may select one of a plurality of schedulers 121, 122, and 123 to schedule the tasks T1, T2, and T3 inserted into the run queue, based on information about generated events. The term "event" denotes a various kinds of system-related events or interrupts that may occur according to an operation of the device equipped with a virtual machine monitor. For example, in an example in which a data processing device based on the virtual machine monitor 100 is mounted on a mobile phone, the "event" or event type may include making and receiving a phone call, the turning on or off of a camera, an operation of a timer which is set in the mobile phone, and the moment that the time is set. These are nonlimiting examples. The scheduler selected according to the event type may be selected based on a scheduler list 143 of the table storage 140. For example, if an event needing to be executed within a preset deadline to achieve real time characteristics occurs, the controller 130 may select the deadline first scheduler 121 among the schedulers 121, 122, and 123.

In addition, the controller 130 may invoke the selected scheduler 121. The invoked scheduler 121 may schedule the tasks T1, T2, and T3 residing on the run queue 110 according to its own scheduling scheme.

As described above, the virtual machine monitor 100 may allow the tasks T1, T2, and T3 of the run queue 110 to be scheduled by use of a scheduler suitable for a predetermined state or for the attribute of each task among the plurality of schedulers 121, 122, and 123, each having a different scheduling characteristic.

FIG. 2 shows an example of a scheduler list.

As shown in FIGS. 1 and 2, the scheduler list 143 may include an event 201, and a scheduler 202 to be invoked according to the event 201. The controller 130 may allow a scheduler suitable for each event to be invoked by referring to the scheduler list 143. For example, in an example in which an event E1 and an event E2 occur, a scheduler S1 may be invoked. In an example in which an event E3 occurs, a scheduler S2 may be invoked. The event 201 may represent various kinds of system events of a virtual machine monitor-based system. In addition, the scheduler S1 and the scheduler S2 may each represent a scheduler having different characteristics or different scheduling policies. The scheduler list 143 may be preset by a manufacturer and may be updated later.

FIG. 3 shows an example of a weight table.

As shown in FIGS. 1 and 3, the weight table 141 may have a weight 302 depending on each task attribute 301, for respective schedulers S1 and S2. The task attribute 301 may represent a requirement for triggering a task, and may include an event source, such as call transmission/reception, deadline, and/or interrupt. Information about such task attribute may be collected by the controller 130 through an operating system corresponding to the domains 101 and 102.

In response to the tasks T1, T2, and T3, having attributes corresponding to events, being inserted in the run queue 110, the controller 130 may determine the order of priority of the tasks T1, T2, and T3 inserted into the run queue 110 with reference to the weight table 141. For example, in an example in which task 1 T1 triggered by event E1 and task 2 T2 triggered by event E2 are received, the controller 130 may give a higher priority to task 1 T1 than task 2 T2 by referring to the weight table 141. In one example, the weight may be differently applied for the respective schedulers S1 and S2. For example, if the event E1 and event E2 do not significantly affect the scheduling characteristic of the scheduler S2, the scheduler S2 may allow task 1 T1 and task 2 T2 to have the same weight.

Meanwhile, if the task 1 T1 and the task 2 T2 have attributes A1, A2, and A3 corresponding to events and both of the task 1 T1 and task 2 T2 are triggered by event type E1, it may be possible that the task 1 and T1 the task 2 T2 have the same priority based on the weight table 141. In one example, the controller 130 may determine the order of priority of the task 1 T1 and the task 2 T2 based on the need for urgent processing of tasks or the need for real time processing of tasks. The weight table 141 may be preset by a manufacturer and may be updated later.

FIG. 4 shows an example of a time table.

As shown in FIGS. 1 and 4, the time table 142 may store time related limitation for each task, e.g., a run time limit for each task. For example, the controller 130 may insert the task into the run queue 110 and periodically update the time table 142.

Figure 5A:
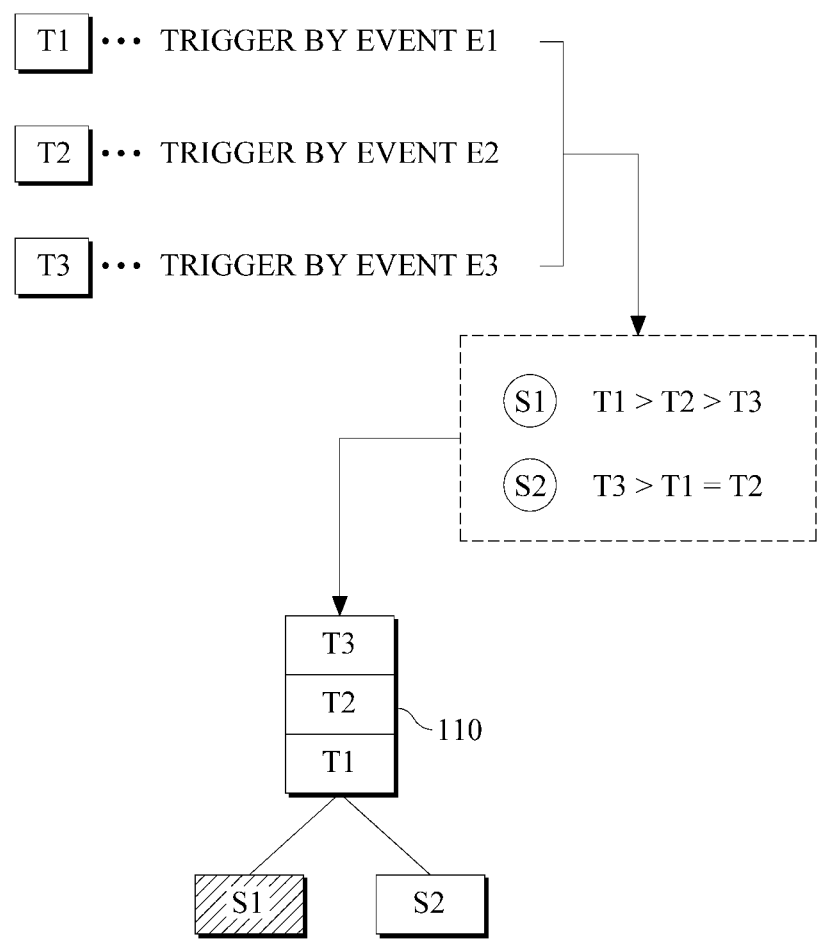
FIG. 5A shows an example of an operation of a virtual machine monitor.
Figure 5B:
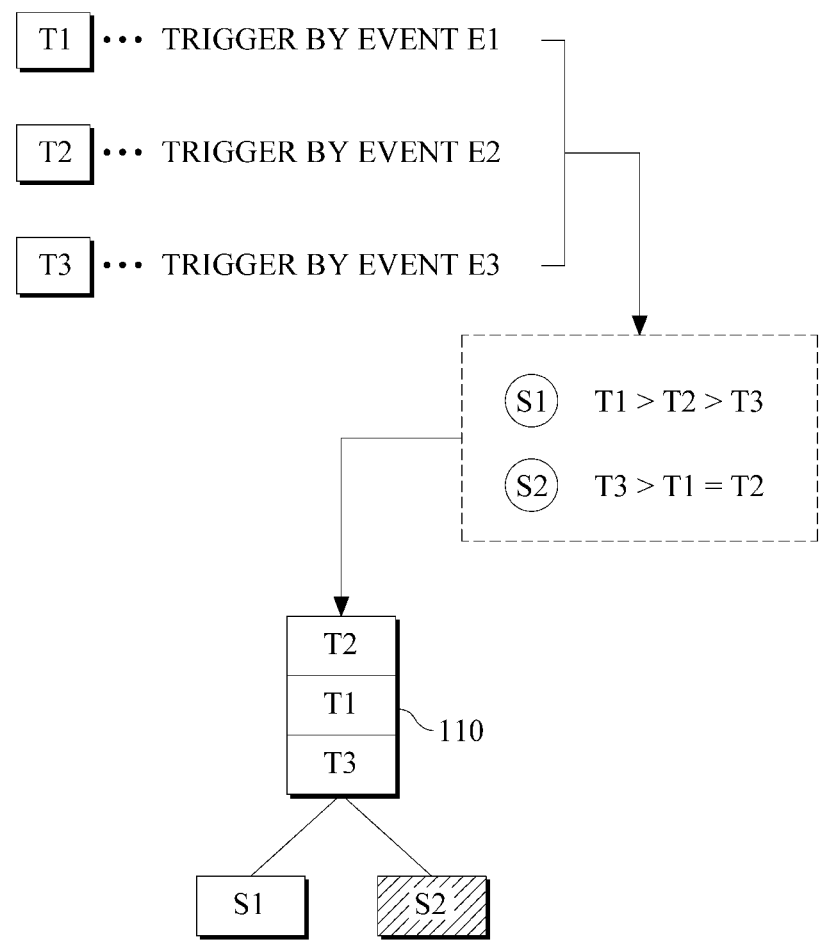
FIG. 5B shows another example of an operation of a virtual machine monitor.

FIGS. 5A and 5B show an example of a selective scheduling operation of a virtual machine monitor.

As shown in FIGS. 1, 5A, and 5B, it may be presumed that three tasks T1, T2, and T3 are received, and the task T1, the task T2 and the task T3 are triggered by the events E1, E2, and E3, respectively. In addition, it may be presumed for this example that the event E3 is a time interrupt and the scheduler S1 and the scheduler S2 exist.

The controller 130 may determine the order of priority of the tasks T1, T2, and T3 in consideration of task attributes, and may insert the tasks T1, T2, and T3 into the run queue 130. The controller 130 may adjust the order of priority of the tasks T1, T2, and T3 by use of the weight table 141 based on the task attribute, for example, "event," and may change the arrangement order of the tasks inserted in the run queue 130.

The weight table 141, according to an example, shows priority weights that may be different with each scheduler. Therefore, the order of priority of tasks to be inserted in the run queue 130 may be adjusted depending on a scheduler used in response to the control unit 130 determining the order of priority of tasks. For example, if the order of priority is determined based on the scheduler S1, the task T1 triggered by the event E1 may have the highest priority, and the tasks T1, T2, and T3 may be inserted into the run queue 130 in the order of task 1 T1, task 2 T2, and task T3 (see, e.g., FIG. 5A). In addition, if the order of priority is determined based on the scheduler S2, the task T3 triggered by the event C may have the highest priority, and the tasks T1, T2, and T3 may be inserted into the run queue 130 in the order of T3, T2, and T1 (see, e.g., FIG. 5B).

As a predetermined event occurs after the tasks T1, T2, and T3 have been inserted into the run queue 130, the controller 130 may select a scheduler suitable for the type of the predetermined event from the schedulers S1 and S2.

For example, as shown in FIGS. 2 and 5A, if the event E1 occurs, the controller 130 may invoke the scheduler S1 by referring to the scheduler list 143. In addition, if the event E3 occurs, the controller 130 may invoke the scheduler S2 by referring to the scheduler list 143.

In an example in which the event E3 is a time interrupt and the scheduler S2 is a deadline scheduler, the controller 130 may update the time table 142 while inserting a task having time related limitation into the run queue 130, and may activate the deadline scheduler upon the occurrence of the time interrupt such that the task having time-related limitation may be primarily scheduled, e.g., has the highest weight and/or priority. In addition, during the absence of a time interrupt, the controller 130 may activate another suitable scheduler, such that tasks may be scheduled according to a predetermined order of priority determined by the activated scheduler.

Figure 6A:
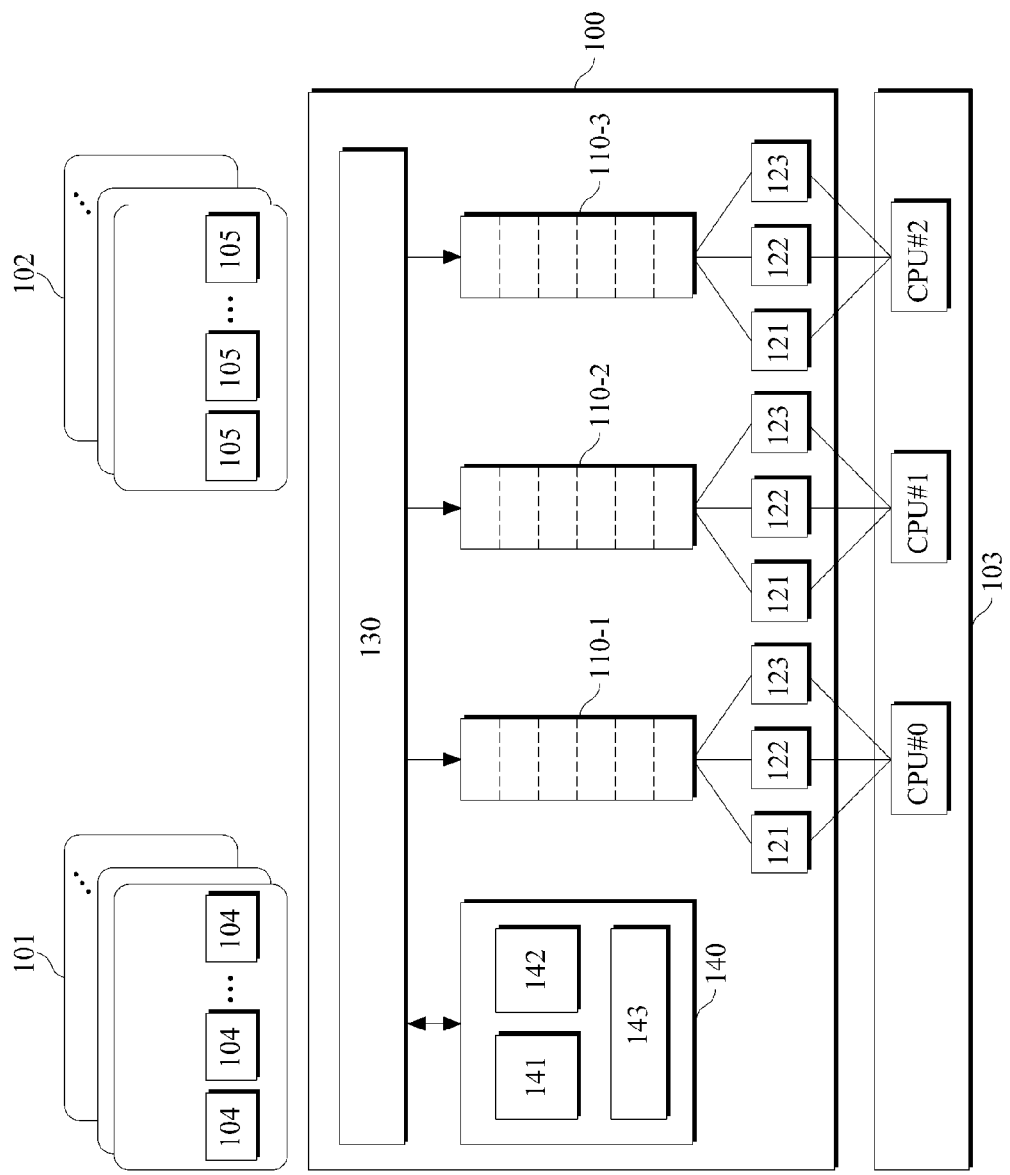
FIG. 6A shows another example of a virtual machine monitor.

FIG. 6A shows another example of a virtual machine monitor.

As shown in FIG. 6A, the virtual machine monitor 100 may include a plurality of run queues 110-1, 110-2, and 110-3 for respective CPU cores (CPU #0, CPU#1, and CPU#2) of the hardware platform 103. In FIG. 6A, the run queues 110-1, 110-2, and 110-3 may be mapped to the three CPU cores (CPU #0, CPU#1, and CPU#2) of the hardware platform 103, respectively. In response to the tasks 104 and 105 being received, the controller 130 may determine a suitable run queue into which the received tasks 104 and 105 are inserted, by use of the task attribute received from the operating system.

Figure 6B:
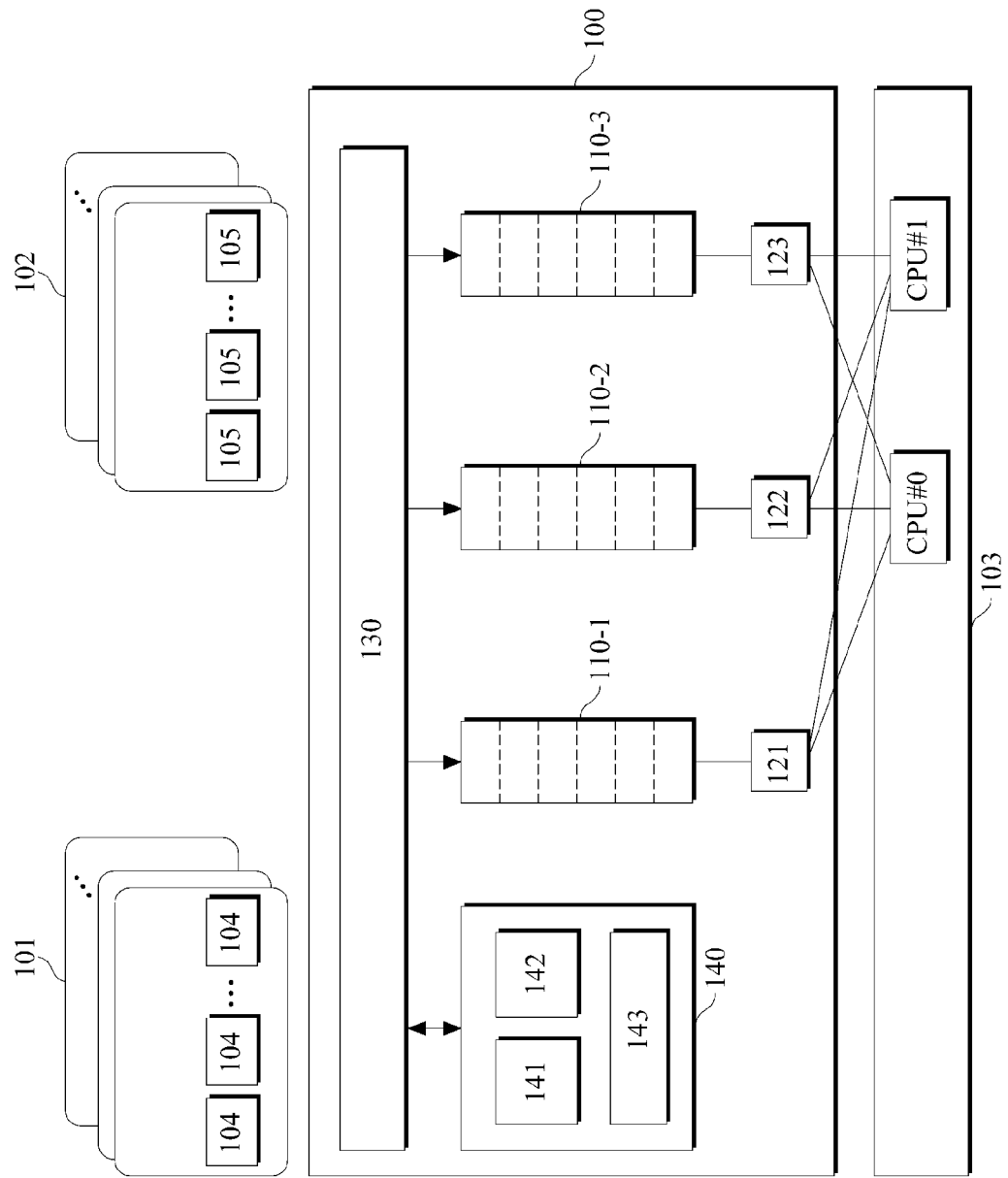
FIG. 6B shows still another example of a virtual machine monitor.

FIG. 6B shows still another example of a virtual machine monitor.

As shown in FIG. 6B, the virtual machine monitor 100 may include a plurality of run queues 110-1, 110-2, and 110-3 for different task attributes. In FIG. 6B, the run queues 110-1, 110-2, and 110-3 may be the most suitable for respective task attributes, and may be mapped to the schedulers 121, 122, and 123, respectively. In response to the tasks 104 and 105 being received, the controller 130 may determine a suitable run queue into which the received tasks 104 and 105 are inserted, by use of the task attribute received from the operating system.

Figure 7:
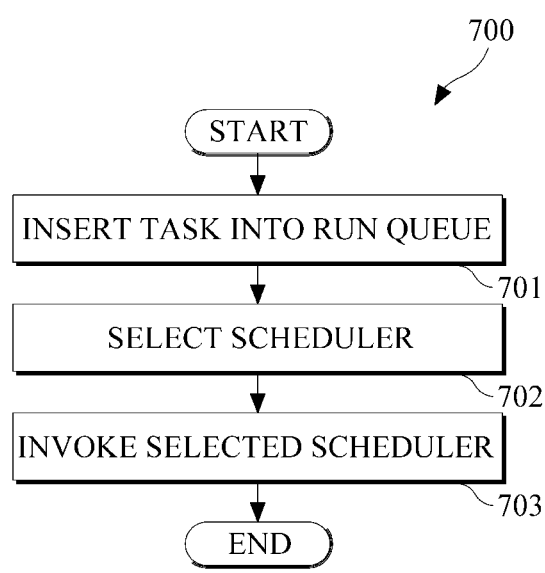
FIG. 7 shows an example of a scheduling method of a virtual machine monitor.

FIG. 7 shows an example of a scheduling method of a virtual machine monitor. The example of the scheduling method may be applied to the system shown in FIG. 1.

As shown in FIGS. 1 and 7, in operation 701, the virtual machine monitor 100 may insert tasks received from the respective domains 101 and 102 into at least one run queue 110. As one example, received tasks may be inserted into the run queue 110 according to the order of priority of the tasks that may be determined based on the weight table 141 or the need for urgent processing of the tasks. In addition, while the task is being inserted into the run queue 110, the time table 142 recording the run time limit of the tasks may be generated or updated.

In addition, in operation 702, the virtual machine monitor 100 may select a scheduler to schedule the tasks T1, T2, and T3 inserted into the run queue 110. That is, the virtual machine monitor 100 may select a scheduler to determine the execution order of the tasks in a hardware platform, among the plurality of schedulers 121, 122, and 123 according to event type. For example, the controller 130 may select the most suitable scheduler for the current state or attributes of the task, with reference to the scheduler list 143 stored in the table storage 140.

In operation 703, the virtual machine monitor 100 may invoke the selected scheduler. For example, the controller 130 may invoke the selected scheduler and may allow the invoked scheduler to schedule the tasks T1, T2, and T3 residing in the run queue 110, according to the scheduling characteristic or scheduling policy of the invoked scheduler.

In response to a plurality of run queues 110 existing, the virtual machine monitor 100 may select a run queue suitable for task attribute by use of a task attribute transferred from the operating system, and may insert the tasks into the selected run queue.

As described above, the virtual machine monitor 100 may operate a plurality of schedulers 121, 122, and 123, the one example, each having different scheduling characteristics, and may schedule tasks by use of a scheduler suitable for the event state or task attribute. In this manner, a predetermined task sensitive to a user's demands, such as a real-time task, may be appropriately scheduled.

Figure 9:
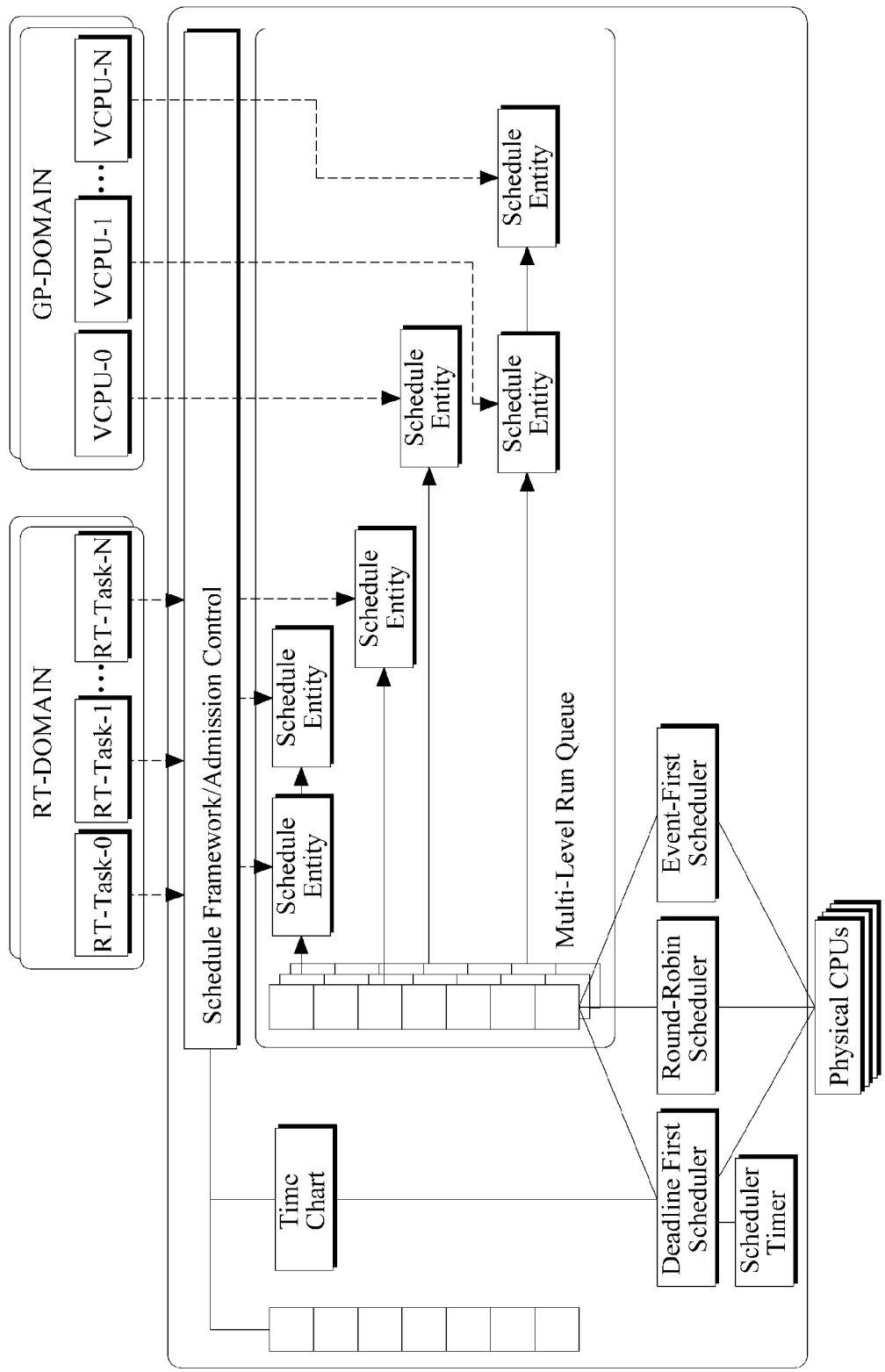
FIG. 9 shows another example of a virtual machine monitor.

FIG. 9 shows another example of a virtual machine monitor (VMM).

The example of FIG. 9 includes elements similar to that of FIG. 1, but in a more detailed illustration. Creation of tasks in the real-time domain (RT-DOMAIN), such as admission control, grouping according to the characteristics of the task, and the relationship between schedulers, may be provided such that real-time characteristics are ensured with respect to a task of each RT-DOMAIN and a task of RT-DOMAINs when a plurality of RT-DOMAINs are executed on a VMM.

Embodiments include providing real-time characteristics in terms of tasks when a plurality of virtual machines (RT-DOMAIN) are executed in a virtual machine monitor (VMM). For example, embodiments managing real-time tasks in the RT-DOMAIN in a unit of scheduling of the VMM, managing the priority order of tasks in a plurality of RT-DOMAINs, grouping schedule entities, and scheduling.

When tasks of the RT-DOMAIN are created, the task may be bounded to the schedule entity of the VMM through a Schedule Framework/an Admission Control unit of the VMM and inserted into a run queue, e.g., run queue 110 of FIG. 1 or the multi-level run queue of FIG. 9. When creating tasks, a Real Time Operating System (RTOS) of the RT-DOMAIN may transfer information, such as a deadline, a period, an event source, and the like, to the Admission Control unit through an interface provided by the VMM. The Admission Control unit of the VMM may bind the real-time task, similar to the task 104 of FIG. 1, to the schedule entity of the VMM based on such information, and may insert the schedule entity into the run queue.

In consideration of the characteristic of the schedule entity, the Admission Control unit may maintain a plurality of run queues and may determine a target run queue when the schedule entity is inserted. The run queue may include a run queue in which a deadline of tasks is highly regarded, i.e., has a highest priority, and a run queue in which an interactivity of a task is highly regarded.

In response to the schedule entity being inserted into the run queue, an Admission Control logic may be capable of adjusting the priority order of the schedule entity based on attributes of the task transferred from the RTOS. For example, for a task triggered by an Event Source, the priority of the schedule entity may be adjusted according to an adjustment value for priority order of an Event Weight Table, e.g., weight table 141 of FIG. 1. As another example, for a task having a limitation on time, a time chart may be maintained in an Admission Control, such that a task having a limitation on time may resume running within a time limit.

The Event Weight Table may be a table having priority weights assigned to each physical event source or logical event source provided from a system. The Event Weight Table may be statically provided when the system is designed or may be updated dynamically during run-time. The Time Chart, e.g., time chart 142 of FIG. 1, may be provided to maintain a time slot of the created schedule entity.

The schedule entity inserted into the run queue may be scheduled through the most suitable scheduler for a predetermined time, e.g., schedulers 121, 122, and 123 of FIG. 1. For example, whenever a timer interrupt occurs or a timer needs to be set, the VMM may update the Time Chart, and may execute a deadline scheduler to schedule a real-time task having a time restriction. In addition, if another type of event other than the timer interrupt occurs, the VMM may schedule the schedule entity using a scheduler suitable for the event. General-purpose domain (GP-DOMAIN) tasks, which may not be real-time tasks, may have a lower priority than the real-time tasks, e.g., RT-DOMAIN tasks.

FIG. 10 shows an example of a method for control logic for a virtual machine monitor.

In a method 1000, in operation 1010, a request to process a task may be received. In operation 1020, a decision may be made as to what type of task has been received. If it a periodic task, e.g., it may be performed at any available time, a decision may be made in operation 1030 as to whether there is an empty time slot available. If an empty time slot is found, the empty time slot may be acquired in operation 1050. In operation 1055, a periodic timer may be set. The task may be approved for processing in operation 1060. If an empty time slot is not found in operation 1030, the task may be rejected in operation 1070.

If it is determined in operation 1020 that the received task is a deadline task, that is, a task having a set time or deadline for completion, a decision may be made in operation 1040 as to whether there is an empty time slot available. If an empty time slot is found, the empty time slot may be acquired in operation 1090. In operation 1095, a snapshot timer may be set. If an empty time slot is not found in operation 1040, a determination may be made in operation 1080 as to whether the received task has a higher priority than a task already exiting in a time slot corresponding to the deadline associated with the task. If not ("NO" branch), the task may be rejected in operation 1070. If the received task has a higher priority ("YES" branch), the desired time slot may be divided in operation 1085, and in operation 1095, the snapshot timer may be set. The task may be approved for processing in operation 1060.

Embodiments may include a method and system capable of providing real time characteristics in a virtual environment, allowing various kinds of real-time operating systems and real-time application stacks to be more effectively executed. Embodiments may provide a virtualization technology which may process multiple domains, e.g., real-time and general-purpose parts, using the same hardware, e.g., a processor or CPU. Embodiments may provide a virtualization technology to provide real-time task processing in an environment in which multiple real-time VM operation is desired.

The type and number of schedulers may be preset by a manufacturer or may be updated and supplemented. The VMM 100 may be a logical construction. Any scheduler may be interrupted for another scheduler, for example, upon receipt of an event or interrupt. Upon completion of the tasks in a particular queue associated with an interrupting scheduler, the VMM 100 may return to the queue for the original interrupted scheduler, or may continue to a different scheduler queue, which may depend on a setting for the interrupting scheduler. There may be one or more run time queues. An urgency of a task or event may change the order of tasks in a queue.

A particular scheduler may process another scheduler's run time queue if no event triggers a change in schedulers. The particular scheduler may process part of its own queue, then may jump to another scheduler's queue, for example, if the other scheduler's characteristic event has not been triggered. For example, a deadline first scheduler, e.g., the scheduler 121, may process a queue for the other scheduler if there is no task having an urgently impending deadline. These are, of course, nonlimiting examples.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the devices described herein may be incorporated in or used in conjunction with mobile devices such as a cellular phone, a personal digital assistant (PDA), a digital camera, a portable game console, and an MP3 player, a portable/personal multimedia player (PMP), a handheld e-book, a portable tablet and/or laptop PC, a global positioning system (GPS) navigation, and devices such as a desktop PC, a high definition television (HDTV), an optical disc player, a setup and/or set top box, and the like, consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A system including a virtual machine monitor that virtualizes hardware for a plurality of domains including a real time domain for real time tasks, and a general domain for general purpose tasks, the virtual machine monitor comprising:

a run queue;
a plurality of schedulers configured to determine an execution order of tasks on the hardware;
a table storage, configured to store:
   a scheduler list configured to store correspondence data, including an identifier of a corresponding scheduler to be invoked, for each type of event that triggers a task,
   a weight table configured to store correspondence data, including a priority weight assigned for each task of a plurality of tasks and each scheduler of the plurality of schedulers, wherein the weight table stores correspondence data for each of the plurality of schedulers, and wherein the priority weights for each scheduler are independent of any other scheduler, and wherein at least two of the plurality of schedulers differ from one another in terms of priority weights, and
   a time table configured to store correspondence data, including a corresponding run time limit for each task that has a run time limit; and
a controller, including a processor, configured to:
   insert a task of the plurality of tasks, received from the real time domain, into the run queue of the virtual machine monitor,
   select a scheduler to schedule the task, from among the plurality of schedulers, based on a type of event that triggers the task,
   adjust an order of priority of the task in the run queue, based on a task attribute and the type of event that triggers the task, and
   determine an order for scheduling the task in the run queue based on the order of priority of the task and the weight table, wherein the plurality of tasks are scheduled for execution based on the determined order.

2. The system including the virtual machine monitor of claim 1, wherein the priority weight varies based on the scheduling characteristics of the scheduler.

3. The system including the virtual machine monitor of claim 1, wherein the controller is further configured to:
   determine an order of priority of the task based on whether the task is for real-time processing.

4. The system including the virtual machine monitor of claim 1, wherein the controller is further configured to:
   generate or update a time table that records a run time limit for each task that has a run time limit.

5. The system including the virtual machine monitor of claim 1, wherein:
   the controller is further configured to invoke the selected scheduler; and
   the task inserted into the run queue is scheduled according to a characteristic of the invoked scheduler.

6. The system including the virtual machine monitor of claim 1, wherein the run queue comprises a plurality of run queues.

7. The system including the virtual machine monitor of claim 6, wherein the plurality of run queues are respectively mapped to a plurality of physical resources that are managed by the virtual machine monitor.

8. The system including the virtual machine monitor of claim 6, wherein the plurality of run queues are mapped to the plurality of schedulers, respectively.

9. The system including the virtual machine monitor of claim 6, wherein the controller is further configured to determine a run queue from among the plurality of run queues, into which the task is inserted, based on the task attribute.

10. The system including the virtual machine monitor of claim 1, wherein:
    the run queue is provided in a form of a matrix having rows and columns based on attributes of the tasks and a point in time when the task is triggered, respectively; and
    the controller is further configured to determine the row and the column, into which the task is inserted, based on the task attribute.

11. The system including the virtual machine monitor of claim 1, wherein:
    the scheduler comprises a deadline scheduler; and
    the controller is further configured to invoke the deadline scheduler in response to a time interrupt occurring as the event type.

12. The system including the virtual machine monitor of claim 1, wherein the task attribute represents a requirement for triggering the task.

13. The system including the virtual machine monitor of claim 12, wherein the requirement for triggering the task includes an event source including at least one of a call transmission/reception, a deadline, and an interrupt.

14. The system including the virtual machine monitor of claim 1, wherein the value of the priority of the task in the run queue is adjusted depending on the selected scheduler.

15. A scheduling method of a system including a virtual machine monitor that virtualizes hardware for a plurality of domains including a real time domain for real time tasks, and a general domain for general purpose tasks, the scheduling method comprising:
   inserting a task of a plurality of tasks, received from the real time domain, into a run queue of the virtual machine monitor;
   selecting a scheduler configured to schedule the task, from among a plurality of schedulers included in the virtual machine monitor, based on an a weight table configured to store correspondence data, including a priority weight assigned for each task of a plurality of tasks and each scheduler of the plurality of schedulers, wherein the weight table stores correspondence data for each of the plurality of schedulers, and wherein the priority weights for each scheduler are independent of any other scheduler, and wherein at least two of the plurality of schedulers differ from one another in terms of priority weights; and
   adjusting an order of priority of the task in the run queue, based on a task attribute and the type of event that triggers the task;
   wherein the inserting of the task comprises determining an order for scheduling the task in the run queue based on the order of priority of the task and the weight table, wherein the plurality of tasks are scheduled for execution based on the determined order.

16. The scheduling method of the system of claim 15, wherein the inserting of the task comprises generating or updating a time table which records a run time limit for each task that has a run time limit.

17. The scheduling method of the system of claim 15, wherein the run queue comprises a plurality of run queues, and the inserting of the task comprises determining a run queue from among the plurality of run queues, into which the task is inserted, based on the task attribute.

18. The scheduling method of the system of claim 15, further comprising:
   invoking the selected scheduler,
   wherein the task inserted into the run queue is scheduled according to a characteristic of the invoked scheduler.

19. A non-transitory computer-readable information storage medium comprising a program to instruct a computer to implement a scheduling method of a system including a virtual machine monitor that virtualizes hardware for a plurality of domains including a real time domain for real time tasks, and a general domain for general purpose tasks, the method comprising:

inserting a task of a plurality of tasks received, from the real time domain into, at least one run queue included in the virtual machine monitor;

selecting a scheduler configured to schedule the task, from among a plurality of schedulers included in the virtual machine monitor, based on an a weight table configured to store correspondence data, including a priority weight assigned for each task of a plurality of tasks and each scheduler of the plurality of schedulers, wherein the weight table stores correspondence data for each of the plurality of schedulers, and wherein the priority weights for each scheduler are independent of any other scheduler, and wherein at least two of the plurality of schedulers differ from one another in terms of priority weights; and adjusting an order of priority of the task in the run queue, based on a task attribute and the type of event that triggers the task; and wherein the inserting of the task comprises determining an order for scheduling the task in the run queue based on the order of priority of the task and the weight table, wherein the plurality of tasks are scheduled for execution based on the determined order.

20. A system including a virtual machine monitor that virtualizes hardware for a plurality of domains including a real time domain for real time tasks, and a general domain for general purpose tasks, the virtual machine monitor comprising:

a plurality of schedulers configured to determine an execution order of tasks on a hardware, wherein at least two of the plurality of schedulers differ from one another in terms of priority weights; and a table storage, configured to store:
  a scheduler list configured to store correspondence data, including an identifier of a corresponding scheduler to be invoked for each type of event that triggers a task,
  a weight table configured to store correspondence data, including a priority weight assigned for each task of a plurality of tasks and each scheduler of the plurality of schedulers, wherein the weight table stores correspondence data for each of the plurality of schedulers, and wherein the priority weights for each scheduler are independent of any other scheduler, and a time table configured to store correspondence data, including a corresponding run time limit for each task that has a run time limit;

a controller, including a processor, configured to:
  insert a task of the plurality of tasks, received from the real time domain, into a run queue of the virtual machine monitor;
  select a scheduler to schedule the task, from among the plurality of schedulers of the virtual machine monitor, based on a type of event that triggers the task, wherein the selected scheduler is configured to be interrupted by another scheduler, among the plurality of schedulers, upon receipt of an interrupt;
  adjust an order of priority of the task in the run queue, based on a task attribute and the type of event that triggers the task, and
  determine an order for scheduling the task in the run queue based on the order of priority of the task and the weight table, wherein the plurality of tasks are scheduled for execution based on the determined order;

a plurality of run queues, each run queue being associated with a respective one of the plurality of schedulers.

21. The system including the virtual machine monitor of claim 20, wherein upon completion of the task in a run queue associated with the other scheduler, the virtual machine monitor is configured to process a run queue associated with the original interrupted scheduler.

22. The system including the virtual machine monitor of claim 20, wherein upon completion of the task in a run queue associated with the other scheduler, the virtual machine monitor is configured to process a run queue associated with a third scheduler queue.

23. The system including the virtual machine monitor of claim 20, wherein:

the run queue is associated with the selected scheduler; and
the selected scheduler is configured to process another run queue corresponding to another scheduler, among the plurality of schedulers, in response to no event triggering a change in schedulers occurring within a predetermined time.

24. The system including the virtual machine monitor of claim 23, wherein the selected scheduler is further configured to:

process part of the run queue associated with the selected scheduler; and
subsequently process the other run queue corresponding to the other scheduler.

25. The system including the virtual machine monitor of claim 20, wherein an urgency of a task changes a priority order of a plurality of tasks in the run queue.

* * * * *